Feb. 5, 1957      T. F. McHENRY      2,780,769

SYSTEM OF REGULATION

Filed Jan. 13, 1954

INVENTOR.
THOMAS F. McHENRY

BY *James and Franklin*

ATTORNEY

United States Patent Office 2,780,769
Patented Feb. 5, 1957

2,780,769

SYSTEM OF REGULATION

Thomas F. McHenry, New Canaan, Conn., assignor to Electric Regulator Corporation, Norwalk, Conn., a corporation of New York Application January 13, 1954, Serial No. 403,815

17 Claims. (Cl. 323—66)

The present invention relates to a system for regulating a given circuit parameter, such as, for example, the voltage, current, or frequency of the output of an electric motor or generator, and in particular to such a system in which special means are provided for increasing the sensitivity thereof or for causing the output to be regulated in an unconventional manner.

Electromagnetically actuated control devices adapted for voltage, current, frequency or speed regulations are well known, and may assume a wide variety of forms. One such device is that disclosed in Patent No. 2,580,732 of January 1, 1952, entitled "Finger Type Circuit Regulator." Depending upon its specific form, control units of this type have a certain inherent degree of accuracy and speed of response. The unit disclosed and claimed in the aforementioned patent, and sold by the Electric Regulator Corporation of Norwalk, Connecticut under the trade name "Regohm," is particularly advantageous in this regard because its design and mode of operation render it capable, when connected in conventional fashion with its coil energized directly by the output to be regulated, of meeting most industrial and military specifications for accuracy and speed of response. However, in some more exacting installations auxiliary circuit elements must be employed to increase the sensitivity of the control device and thus give rise to a more accurately regulated parameter. In such situations failure of these auxiliary circuit elements results in failure of the entire regulating system. This is an obviously undesirable situation, particularly where the regulating component itself, apart from the effect thereon of the auxiliary circuit components, is capable of performing a satisfactory job of regulation under normal circumstances. For example, a radar operator in military aircraft would much rather have a set which would operate with reasonable accuracy than one which did not operate at all.

The present invention teaches the use of a regulatory system in which a special sensing instrumentality is employed in conjunction with the electromagnet coil of the regulatory unit in order to increase the sensitivity of operation thereof, and in which means are provided for automatically cutting that sensing instrumentality out of the system upon failure or malfunctioning thereof and permitting the electromagnet coil of the regulatory unit thereafter to function in its normal manner and provide that degree of regulatory accuracy of which the unit is inherently capable. To that end a relay coil is connected in series with the sensing instrumentality and the electromagnet coil of the regulatory unit, and a shunt connection is provided around the relay coil and the sensing instrumentality, the shunt connection including a pair of normally closed contacts operatively connected to the relay coil so as to be opened thereby, thus open-circuiting the shunt connection, whenever the relay coil is energized to a predetermined degree. It follows that so long as the sensing instrumentality is energizing the coil of the regulatory unit in an appropriate manner, the contacts will be held open and the sensing instrumentality will be operative. However, upon failure or malfunctioning of the sensing instrumentality or the relay coil, the contacts will close and the coil of the regulatory unit will be energized as though the sensing instrumentality were not present in the system.

The precise nature of the sensing instrumentality employed is not of the essence of the broader aspects of the present invention, nor is it necessary that the sensing instrumentality be employed specifically or primarily for the purpose of increasing the sensitivity of the system. For example, a ferroresonant structure could be employed in place of the electron tubes specifically disclosed, or the diode of Fig. 1 could be employed primarily for R. M. S. detection instead of for increased sensitivity.

To the accomplishment of the above, and to such other objects as may hereinafter appear, the present invention relates to the details of a regulatory system as defined in the appended claims and as described in this specification, taken together with the accompanying drawings, in which:

Figure 1:
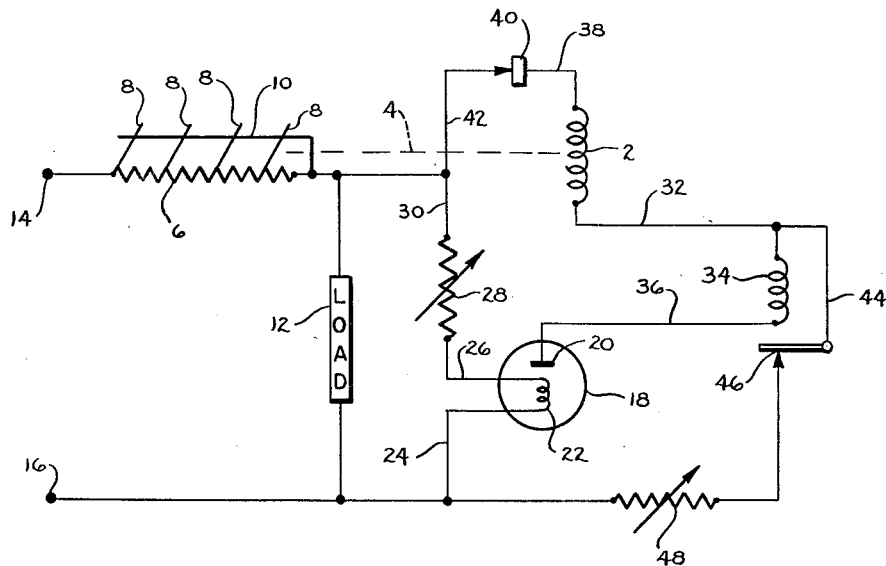
Fig. 1 is a circuit diagram of one embodiment of the invention.

The regulatory systems here specifically disclosed both relate to the control and regulation of the voltage applied to a load, but this is to be taken as typical of the many applications to which the present invention may be applied, as, for example, regulation of the voltage or current output of a generator or alternator, the frequency of the output of an alternator, the speed of a motor, and even regulation of combinations of these parameters. The regulatory unit comprises an electromagnetic coil 2 adapted to be energized in the manner subsequently described. This coil is operatively connected, as indicated by the broken line 4, to a variable resistance 6 inserted in an appropriate circuit so as to control the parameter desired. In the electromagnetic unit of my Patent No. 2,580,732 the electromagnetic coil 2 controls the positioning of a plurality of contact fingers 8 in relation to a short circuiting bar 10. For the regulation of line voltage applied to the load 12 across terminals 14 and 16, the resistance 6 is inserted in series with the load 12, and the effective value of that resistance is determined by the number of contact fingers 8 which make electrical connection with the short circuiting bar 10. The coil 2 is connected across the load 12 so that its energization is determined by the voltage applied to the load 12, any increase in that voltage above the desired value causing an increase in energization of the coil 2, this in turn causing the sequential lifting of contact fingers 8 from the short circuiting bar 10 until the value of the resistance 6 is increased sufficiently to restore the voltage across the load 12 to its desired value.

In order to increase the inherent sensitivity of the regulatory unit of which the elements 2, 4, 6 and 10 are a part, a diode electron tube 18 is employed in the system of Fig. 1, that tube having a plate 20 and a cathode 22, the electron emission of which is determined by the current passing therethrough. One end of the cathode 22 is connected by means of lead 24 to one side of the load 12 and the other end of the cathode 22 is connected by lead 26, adjustable resistor 28 and lead 30 to the other side of the load 12. Consequently the voltage applied to the load 12 will cause a current to pass through the cathode 22 which is proportional to that voltage. One end of the electromagnetic coil 2 of the regulatory unit is connected by means of lead 32, relay coil 34, and lead 36 to the anode 20 of the tube 18. The other end of the coil 2 is connected by lead 38, rectifier 40, and lead 42 to the upper end of the load 12. A rectifier 40 is employed when an A. C. voltage is applied to the load 12 and D. C. energization of the coil 2 is in order, as is usually the case. Connected between the lower end of the load 12 and the lower end of the coil 2, and in shunt with the relay coil 34 of the tube 18 which defines the sensing instrumentality, is a shunt connection consisting of lead 44, normally closed contacts 46 and adjustable resistor 48.

Normal operation of the system of Fig. 1, with the sensing instrumentality defined by the tube 18 operative, is as folows: The voltage applied across the load 12 causes a current to flow through the cathode 22 which will vary with that voltage and the absolute magnitude of which will be controlled in part by the setting of the adjustable resistor 28, variation of the latter fixing the value of voltage at which regulation is to take place. Because of the characteristics of the tube 18, variation in the current flowing through the cathode 22 will give rise to variation in the electrons emitted therefrom, this in turn giving rise to an amplified degree of variation in the current flow from the cathode 22 to the anode 20 of the tube 18. This current flow will pass through the relay coil 34 and through the coil 2 of the regulatory unit. When this latter current is at a value sufficient to operatively energize the coil 2 of the regulatory unit, it will energize the relay coil 34 to a degree sufficient to open the contacts 46. Because of the characteristics of the tube 18, a small proportional variation in the voltage applied to the load 12 will cause a much greater proportional variation in the energization of the coil 2, thus increasing the overall sensitivity of the system. It may also be mentioned that the electron emission from the cathode 22 is usually proportional, not to the maximum value of an alternating current passing therethrough, but instead to the R. M. S. value thereof, thus making the system sensitive to the latter rather than to the former.

If for some reason the tube 18, the resistor 28 or the relay coil 34 should fail or should operate so improperly that the coil 2 of the regulatory unit is inadequately energized, the contacts 46 will close and short the relay coil 34 and tube 18 out of the circuit. The coil 2 of the regulatory unit will then be directly energized by the voltage applied to the load 12, in standard fashion, the setting of the resistor 48 determining the voltage at which regulation takes place. In view of the well known susceptibility of electron tubes to malfunctioning because of aging or vibration, the shunt circuit 44, 46, 48 therefore gives rise to a very significant safety factor in the operation of the system, ensuring that regulation will continue even when the auxiliary sensing instrumentality fails.

Figure 2:
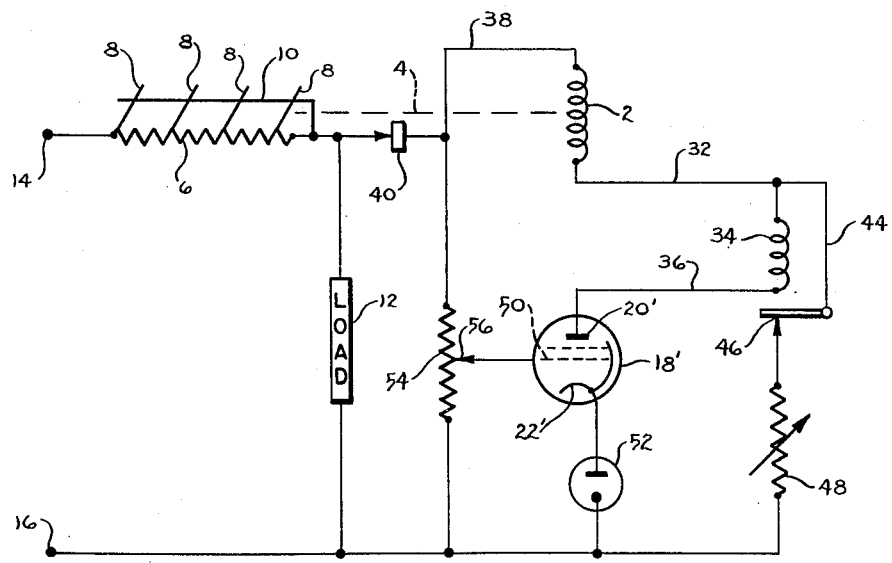
Fig. 2 is a circuit diagram of another embodiment thereof.

The system of Fig. 2 is essentially similar to that of Fig. 1 except that a different auxiliary sensing instrumentality is employed, with consequent variations in specific circuitry. There the tube 18' which defines the auxiliary sensing instrumentality comprises a plate 20', a cathode 22', and a control grid 50, the tube 18' being connected across the load 12 in series with the relay coil 34, the coil 2 of the regulatory unit and the rectifier 40 when there is an alternating voltage which is to be regulated. The cathode 22' of the tube 18' may be connected to the lower end of the load 12 by means of a voltage regulation tube 52 in order to further increase the accuracy of the system, as is disclosed in copending application Ser. No. 286,490 of Thomas F. McHenry, filed May 7, 1952, and entitled "High Performance Regulating System" and assigned to Electric Regulator Corporation. A potentiometer 54 having an adjustable tap 56 is connected across the load 12 in series with the rectifier 40. The position of the tap 56 will determine the value of the regulated voltage when the tube 18' is operative, the current through the tube 18' and the coil 2 being determined in part by the voltage applied to the control grid 50, variations in the tube voltage being amplified over variations in the current passing through the potentiometer 54 in known fashion. As in the previous embodiment, the shunt connection 44, 46, 48 is provided across the relay coil 34, the tube 18' and the tube 52 when employed. As in the previous embodiment, so long as the tube 18' satisfactorily energizes the coil 2 of the regulatory unit to a predetermined degree, the contacts 46 will be opened and the super-sensitive regulatory system will be operative. If the tube 18', the relay coil 34 or the potentiometer 54 should malfunction so that the relay coil 2 is insufficiently energized, the contacts 46 will close, the tube 18' and its associated circuitry will be rendered inoperative, and the regulatory unit will function in conventional manner, the magnitude of the regulated voltage being determined by the setting of the resistor 48.

Thus, by the addition of a smiple relay 34, 46 and an additional variable resistor 48, complex and super-sensitive circuitry can be employed to increase the accuracy or otherwise modify the operation of the basic regulatory unit, but without essentially decreasing the reliability of the regulatory unit itself. It is true that upon failure of any portion of the complex circuitry the function of that circuitry, for example, to increase the sensitivity of the system, will be lost, but the system will not completely fail, and regulation will continue at an acceptable degree of accuracy until the defect in the circuitry can be corrected. The significance of this improvement, when applied to equipment where continuity of operation is essential and under circumstances when repair and adjustment cannot immediately be made, is self-evident.

While but two specific embodiments of the present invention have been here disclosed, it will be apparent that many variations may be made, all within the scope of the present invention as defined in the following claims.

I claim:

1. A regulating system utilizing an electromagnetic regulatory unit having an operating component the energization of which controls the regulatory action, said system comprising, connected in series, and in operative relation to the regulated output, said operating component, a relay coil, and a sensing instrumentality for the parameter to be regulated; and a shunt connection across said relay coil and said sensing instrumentality and in series with said operating component and including a set of normally closed contacts operatively connected to said relay coil so as to be opened when said relay coil is energized to a predetermined extent, whereby, upon failure of said sensing instrumentality or said relay coil, regulation will continue in normal fashion.

2. In the system of claim 1, an adjustable resistor operatively connected to said instrumentality and a second adjustable resistor in said shunt connection.

3. The system of claim 1, in which said instrumentality comprises a diode tube the plate and cathode of which are in series with said relay coil, and in which the cathode is itself connected across the regulated output in series with an adjustable resistor.

4. The system of claim 1, in which said instrumentality comprises an electron tube having cathode, plate and control grid, said plate and cathode being connected in series with said relay coil, a potentiometer having an adjustable tap being connected across said regulated output, and said control grid being connected to said tap.

5. An A. C. regulating system utilizing an electromagnetic regulatory unit having an operating component the energization of which controls the regulatory action, said system comprising a first circuit in operative relation to said output and comprising an output sensing element, a second circuit in operative relation to said output comprising said operating component, a relay coil, and an instrumentality operatively connected to said output sensing element so that the current passed thereby is determined by said element, a rectifier in at least one of said first and second circuits, and a circuit in shunt with said relay coil and said instrumentality and in series with said operating component and including a pair of normally closed contacts operatively connected to said relay coil so as to be opened when said relay coil is energized to a predetermined extent, whereby, upon failure of said sensing instrumentality or said relay coil, regulation will continue in normal fashion.

6. The system of claim 5, in which a rectifier is only in said second circuit.

7. The system of claim 6, in which a first adjustable resistor is in series with said sensing element and a second adjustable resistor is in said second circuit.

8. The system of claim 6, in which said instrumentality comprises an electron tube having cathode and plate connected in series in said second circuit, said cathode being connected in said first circuit and defining said output sensing element.

9. The system of claim 6, in which said instrumentality comprises an electron tube having cathode and plate connected in series in said second circuit, said cathode being connected in said first circuit in series with an adjustable resistor and defining said output sensing element.

10. The system of claim 5, in which said instrumentality comprises an electron tube having cathode and plate connected in series in said second circuit, said cathode being connected in said first circuit and defining said output sensing element.

11. The system of claim 5, in which said instrumentality comprises an electron tube having cathode and plate connected in series in said second circuit, said cathode being connected in said first circuit in series with an adjustable resistor and defining said output sensing element.

12. The system of claim 5, in which a rectifier is in both said first and second circuits.

13. The system of claim 12, in which an adjustable resistor is in said second circuit.

14. The system of claim 5, in which a single rectifier is common to both said first and second circuits.

15. The system of claim 14, in which an adjustable resistor is in said second circuit.

16. The system of claim 12, in which said element comprises a potentiometer having an adjustable tap, and in which said instrumentality comprises an electron tube having cathode and plate connected in series in said second circuit and having a control grid connected to said tap.

17. The system of claim 12, in which said element comprises a potentiometer having an adjustable tap, and in which said instrumentality comprises an electron tube having cathode and plate connected in series in said second circuit and having a control grid connected to said tap, and in which an adjustable resistor is in said second circuit.

References Cited in the file of this patent

UNITED STATES PATENTS 1,936,692   Stoller _____ Nov. 28, 1933